US011423474B1

(12) United States Patent
Ribeiro

(10) Patent No.: US 11,423,474 B1
(45) Date of Patent: Aug. 23, 2022

(54) SECURING CAPITAL OFFERS USING BLOCKCHAIN TRANSACTION RECONSTRUCTION

(71) Applicant: Block, Inc., San Francisco, CA (US)

(72) Inventor: Daniel Ribeiro, San Francisco, CA (US)

(73) Assignee: BLOCK, INC., San Francisco, CA (US)

( * ) Notice: Subject to any disclaimer, the term of this patent is extended or adjusted under 35 U.S.C. 154(b) by 487 days.

(21) Appl. No.: 15/897,105

(22) Filed: Feb. 14, 2018

(51) Int. Cl.
*G06Q 40/02* (2012.01)
*G06Q 20/10* (2012.01)
*G06Q 20/36* (2012.01)
*H04L 67/104* (2022.01)
*H04L 9/06* (2006.01)

(52) U.S. Cl.
CPC ........... *G06Q 40/025* (2013.01); *G06Q 20/10* (2013.01); *G06Q 20/36* (2013.01); *H04L 9/0637* (2013.01); *H04L 67/104* (2013.01)

(58) Field of Classification Search
CPC ...... G06Q 40/025; G06Q 10/10; G06Q 20/36; G06Q 20/10; H04L 9/0637; H04L 67/104
See application file for complete search history.

(56) References Cited

U.S. PATENT DOCUMENTS

| | | | |
|---|---|---|---|
| 5,797,133 A | 8/1998 | Jones et al. | |
| 7,962,436 B2 | 6/2011 | Brelage et al. | |
| 8,447,689 B2 * | 5/2013 | Ghosh | G06Q 40/00 705/38 |
| 8,566,199 B2 | 10/2013 | Walker et al. | |
| 8,630,929 B2 * | 1/2014 | Haggerty | G06Q 40/025 705/35 |
| 9,298,806 B1 * | 3/2016 | Vessenes | G06Q 20/065 |
| 9,849,364 B2 * | 12/2017 | Tran | A61B 5/11 |
| 10,084,607 B2 * | 9/2018 | Toll | G06F 21/57 |
| 10,127,591 B1 * | 11/2018 | Wollmer | G06Q 30/0603 |
| 10,339,523 B2 | 7/2019 | McDonough et al. | |
| 10,726,491 B1 * | 7/2020 | Hockey | G06F 16/285 |

(Continued)

FOREIGN PATENT DOCUMENTS

| | | | | |
|---|---|---|---|---|
| CN | 105608146 A | * | 5/2016 | |
| CN | 108171601 B | * | 7/2021 | G06Q 40/04 |

(Continued)

OTHER PUBLICATIONS

Antonopoulos, Andreas M., "Mastering Bitcoin" (Year: 2010).*

(Continued)

*Primary Examiner* — Scott C Anderson
*Assistant Examiner* — James H Miller
(74) *Attorney, Agent, or Firm* — Mattingly & Malur, PC

(57) ABSTRACT

Techniques for disambiguating a blockchain in order to extend, modify, and/or approve a capital loan offer is described. A serving computing device may use a blockchain address to reconstruct and analyze a blockchain wallet. The serving computing device may transmit a capital offer to a device associated with the blockchain wallet, where the terms specified by the capital offer may be based on characteristics of the reconstructed wallet determined by the analysis. The serving computing device may further modify and/or approve a former capital offer, based on the characteristics of the reconstructed wallet.

19 Claims, 7 Drawing Sheets

(56) References Cited

U.S. PATENT DOCUMENTS

| | | | |
|---|---|---|---|
| 10,755,263 B1* | 8/2020 | Ramanathan | G06Q 20/36 |
| 10,949,837 B1* | 3/2021 | Ramanathan | G06Q 20/36 |
| 2011/0137788 A1* | 6/2011 | Merkle | G06Q 40/02 |
| | | | 705/38 |
| 2012/0022945 A1* | 1/2012 | Falkenborg | G06Q 30/0255 |
| | | | 706/12 |
| 2014/0258118 A1* | 9/2014 | Scott | G06F 21/316 |
| | | | 705/44 |
| 2015/0294425 A1* | 10/2015 | Benson | G06Q 40/123 |
| | | | 705/31 |
| 2016/0321723 A1 | 11/2016 | Stein | |
| 2017/0018029 A1 | 1/2017 | Eiriz et al. | |
| 2017/0046651 A1 | 2/2017 | Lin et al. | |
| 2017/0228731 A1* | 8/2017 | Sheng | G06Q 20/382 |
| 2018/0075527 A1* | 3/2018 | Nagla | G06Q 40/025 |
| 2018/0089757 A1 | 3/2018 | Forrester et al. | |
| 2018/0158139 A1* | 6/2018 | Krajicek | G06Q 40/025 |
| 2018/0211313 A1* | 7/2018 | Narahari | G06Q 40/025 |
| 2018/0349990 A1* | 12/2018 | Diriye | H04L 51/02 |
| 2019/0104102 A1* | 4/2019 | Khan | H04L 9/0825 |
| 2019/0130399 A1* | 5/2019 | Wright | H04L 9/3297 |
| 2019/0147486 A1* | 5/2019 | Monaco | G06Q 20/322 |
| | | | 705/14.38 |
| 2021/0056620 A1* | 2/2021 | Tang | H04L 9/0637 |

FOREIGN PATENT DOCUMENTS

| | | | | |
|---|---|---|---|---|
| EP | 3714418 A1 * | 9/2020 | | G06Q 20/102 |
| WO | WO-2019051451 A1 * | 3/2019 | | G06Q 20/06 |

OTHER PUBLICATIONS

Di Battista, Giuseppe, Valentino Di Donato, Maurizio Patrignani, Maurizio Pizzonia, Vincenzo Roselli, and Roberto Tamassia. "Bitconeview: visualization of flows in the bitcoin transaction graph." In 2015 IEEE Symposium on Visualization for Cyber Security (VizSec), pp. 1-8. IEEE, 2015. (Year: 2015).*

Mastering Bitcoin (Year: 2014).*

Non-Final Office Action dated Jun. 27, 2018, for U.S. Appl. No. 15/897,149, of Ribeiro, D., filed Feb. 14, 2018.

Final Office Action dated Dec. 27, 2018, for U.S. Appl. No. 15/897,149 of Ribeiro, D., filed Feb. 14, 2018.

Advisory Action dated Mar. 13, 2019, for U.S. Appl. No. 15/897,149 of Riberio, D., filed Feb. 14, 2018.

Non-Final Office Action dated Dec. 20, 2019, for U.S. Appl. No. 15/897,149, of Ribeiro, D., filed Feb. 14, 2018.

Advisory Action dated Sep. 1, 2020, for U.S. Appl. No. 15/897,149 of Riberio, D., filed Feb. 14, 2018.

Final Office Action dated Jun. 15, 2020, for U.S. Appl. No. 15/897,149 of Riberio, D., filed Feb. 14, 2018.

Non-Final Offce Action dated Feb. 16, 2021, for U.S. Appl. No. 15/897,149 of Riberio, D., filed Feb. 14, 2018.

Final Office Action dated Aug. 2, 2021, for U.S. Appl. No. 15/897,149 of Riberio, D., filed Feb. 14, 2018.

* cited by examiner

SECURING CAPITAL OFFERS USING BLOCKCHAIN TRANSACTION RECONSTRUCTION

BACKGROUND

A blockchain is a public record of transactions stored in a digital ledger that is disseminated across devices participating in the blockchain. Blockchains are frequently used to back cryptocurrencies. The blockchain stores the transactions according to an encryption scheme that obscures the digital addresses of the senders and recipients of cryptocurrency and the keys for releasing cryptocurrency to the recipient. Blockchains therefore deviate from a traditional ledger in that the ledger information is not cognizable by a human or even computers that are not privy to the transaction.

Therefore, though an entity might regularly conduct transactions using a cryptocurrency, such transactions do nothing to help the entity obtain lines of credit, since the encryption scheme of blockchains prevents potential lenders from analyzing the transactions conducted by the entity. For example, a merchant might offer customers the ability to transact in a cryptocurrency to attract additional business and as a benefit to those customers that desire to transact in the cryptocurrency. However, if the merchant wants to obtain a loan for their business, the merchant might be disadvantaged, even severely so, because those transactions the merchant conducted in cryptocurrencies are not able to be used to demonstrate their credit-worthiness because of the present status and level of encryption associated with transactions on the blockchain.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
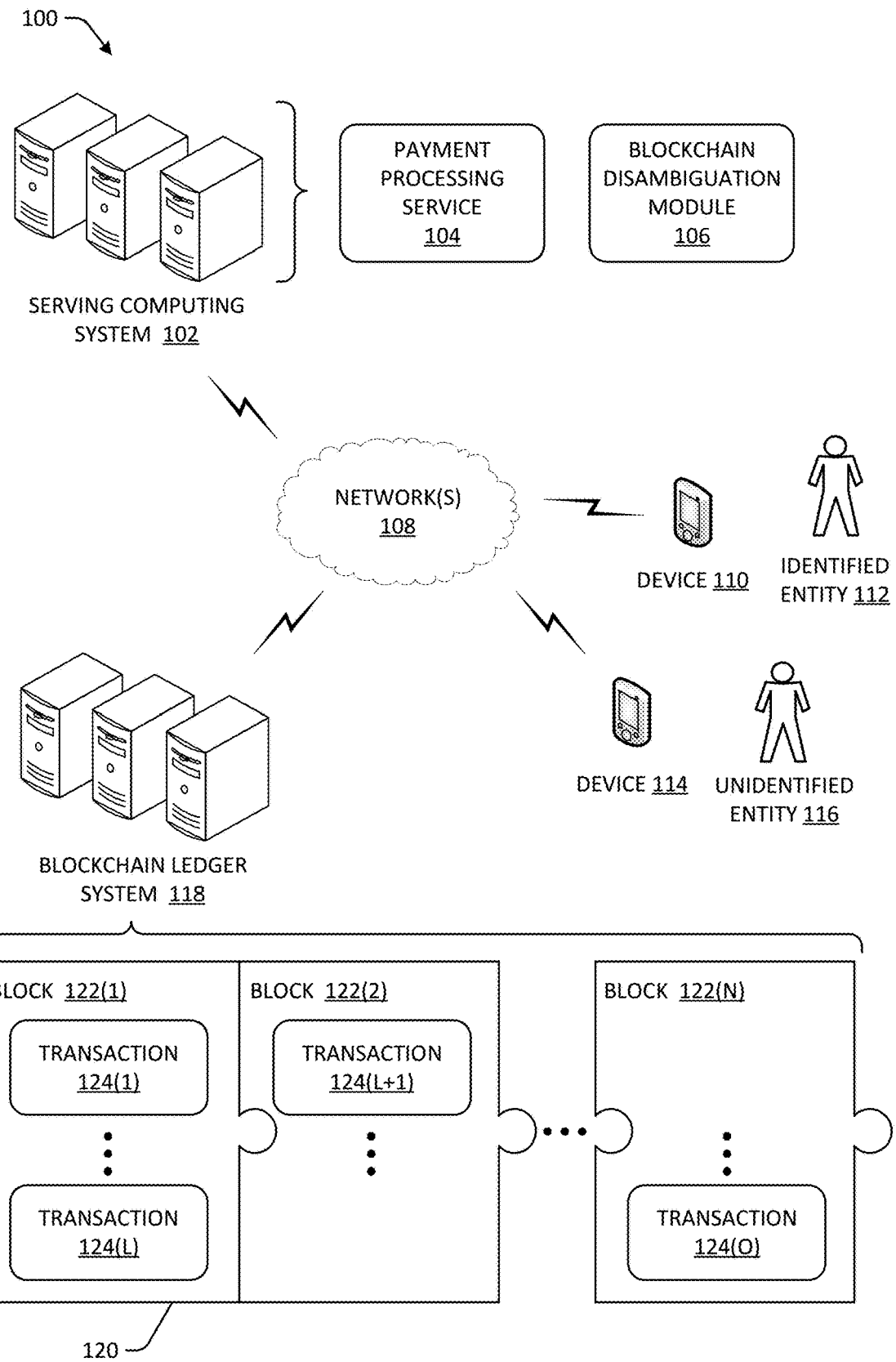
FIG. 1 illustrates a block diagram of an example environment for disambiguating a blockchain to extend, modify, and/or approve a capital offer.

This disclosure is directed to techniques (e.g., machines, processes) for disambiguating a blockchain to extend, modify, and/or approve a capital offer. Techniques discussed herein may disambiguate the blockchain for at least one cryptocurrency account associated with an entity to reconstruct a virtual or digital wallet (e.g., activities associated with a cryptocurrency account). For instance, the blockchain may obscure, by encryption, the address from which funds are drawn (i.e., a payor address) and the address to which the funds are transferred (i.e., a payee address) for a respective transaction of a blockchain. Disambiguating blockchain information for a particular cryptocurrency account may include reconstructing the transactions made to and from a particular cryptocurrency account (e.g., all transactions associated with the cryptocurrency account recorded by the blockchain or a subset thereof). Such a reconstruction is referred to herein as a "reconstructed wallet." In some examples, the techniques may include extending, modifying, and/or approving a capital offer based at least in part on an analysis of the reconstructed wallet.

In some examples, techniques discussed herein include i) receiving a blockchain address from a computing device and/or ii) identifying a blockchain address that is repeated in entries of the blockchain. Once a blockchain address has been received or identified, the techniques may include determining a subset of the transactions recorded on the blockchain that are associated with the blockchain address. For example, to determine the subset of transactions, techniques may include searching the blockchain for transactions that include the blockchain address as a payor address and/or a payee address.

In some examples, the techniques may include reconstructing a virtual wallet based at least in part on the subset of transactions. This may include determining an amount, date, and/or other characteristics of cryptocurrency transferred to and/or from the reconstructed wallet. The techniques may further include determining one or more characteristics of currency transferred to and/or from the reconstructed wallet such as, for example, whether the net flow of currency to and from the account is positive or negative; a moving average of net flow to and/or from the reconstructed wallet; an age of the reconstructed wallet; an amount of transactions conducted with the reconstructed wallet per time period; an average value of transactions to and/or from the reconstructed wallet; identification of accounts with which the reconstructed wallet regularly interacts (e.g., threshold amount and/or value of transactions conducted with another account); etc. For example, the characteristics may include an income factor that may include one of the characteristics discussed above and/or a percentage or multiplier of an entity's income.

In some examples, the techniques may include extending, modifying, and/or approving a capital offer based, at least in part, on the reconstructed wallet and/or one or more characteristics of the reconstructed wallet. In some examples, a capital offer may be associated with a capital loan product such as, for example, a product that facilitates the offering and/or lending of a loan to a borrower that is to be used, for, in some instances, financing the borrower's short-term operational needs. For example, a potential borrower that is a merchant can obtain a capital loan via a capital loan product to finance various operational costs (e.g., rent, payroll, inventory, etc.).

In some examples, a payment processing service may offer the capital loan product in addition to other products to assist potential borrowers with their operational needs. For example, a payment processing service may offer a capital loan product in addition to a product for tracking inventory, a product for processing payments, a product for managing employees, a product for managing payroll, etc. In some examples, the payment processing service may offer different types of loan products within the capital loan product. For example, the payment processing service may offer a daily repayment loan product, wherein a capital loan is repaid daily, for instance, from a portion of transactions processed by the payment processing service on behalf of the borrow. Of course, daily repayment may be provided via an alternative source (e.g., a borrower's bank account, etc.) as well. Additionally and/or alternatively, the payment processing service may offer a monthly repayment loan product, wherein a capital loan is repaid monthly, for instance, via a debit from a bank account linked to the payment processing service. Of course, monthly repayment may be provided via an alternative source (e.g., an unlinked bank account, etc.) as well. One or more additional and/or alternative loan products may be associated with the capital loan product.

In some examples, the techniques may include extending, modifying, and/or approving the capital loan product referred to in a capital offer based, at least in part, on the reconstructed wallet and/or one or more characteristics of the reconstructed wallet. For example, the determination to extend, modify, and/or approve the capital loan product may be based, at least in part, on determining that characteristics associated with the reconstructed wallet meet (satisfy) predetermined criterion. For example, the techniques may include determining that the characteristics associated with the reconstructed wallet indicate a net positive flow of funds to and from the reconstructed wallet and/or that a moving average of net flow indicates a positive trend before extending a capital offer. In some examples, if the predetermined criterion isn't met, the capital offer may not be extended, or, if one has been extended, the offer may be modified, or the offer may be denied.

Extension of a capital offer to an entity may include transmitting an indication referring to the capital loan product to a device associated with the entity, making the capital loan product available for selection and/or acceptance via a device associated by the entity, etc. Where characteristics associated with the reconstructed wallet do not satisfy a predetermined criterion, the offer may be modified. For example, a different capital loan product may be transmitted or made available for selection and/or acceptance, and/or terms of a capital loan product may be changed. In either example, the different capital loan product and/or the changed terms may be associated with a second predetermined criterion that is met by the characteristics associated with the reconstructed wallet.

In some examples, if the characteristics of the reconstructed wallet satisfy the predetermined criterion, the capital offer may be approved. In response to the approval, the entity may be provided with an option to cause funds to be transferred to an account associated with the entity according to the terms of the capital loan product (e.g., an amount of funds specified by the capital loan product as the loan amount may be transferred). In an additional or alternate example, the approval may itself cause the funds to be transferred without further action by the entity.

In some examples, techniques discussed herein may be employed for entities that are identified and/or entities that are unidentified. For example, identified entities might be those entities which a payment processing service has at least some information and/or previous contact. In some examples, an identified entity might be a merchant and/or customer registered with the payment processing service and/or an entity that has otherwise provided at least some information about themselves to the payment processing service (e.g., by visiting a website associated with the payment processing service, providing payment information and/or an email for a transaction with a merchant). By contrast, an unidentified entity may be an entity that has not provided any information directly to the serving computing system. In some examples, obscured information about transactions conducted by identified and unidentified entities may be publicly available in a blockchain.

The techniques may further include i) receiving a blockchain address from a computing device associated with an identified entity and/or ii) identifying, from a blockchain, a repeated blockchain address associated with an unidentified entity. In some examples, the techniques may reconstruct a wallet associated with a repeated blockchain address and extend an offer to a device associated with the reconstructed wallet via the blockchain, without knowing any other information about the entity associated with account. In other words, the techniques may equip a computer to identify a reconstructed wallet that satisfies a predetermined criterion and transmit, via a blockchain transaction, a capital offer to a blockchain address associated with the reconstructed wallet, even when an email, physical address, name, or other contact information cannot be or has not been identified.

Techniques discussed herein may improve a computer by making data that is normally obscured to humans and computing systems alike through encryption, detectable so that a payment processing system may analyze the data with respect to a capital offer. Moreover, the techniques equip a computer to recognize cryptocurrency accounts that may satisfy predetermined criterion for a capital loan product and equip the computer to contact an entity associated with such an account, even when no contact information is known for the entity. The techniques also provide a technical solution for a problem that has arisen solely because of the advent of blockchain technology. Entities that deal in cryptocurrency may not be able to obtain a capital loan because they would be unable to rely on cryptocurrency transactions recorded in a blockchain to demonstrate their creditworthiness or ability to repay a loan because of the anonymity blockchain transactions. These techniques include a novel arrangement of computer components and operations that solve that problem by disambiguating the blockchain for an account and extending, modifying, and/or approving a capital offer based at least in part on the disambiguation.

Example Environment

FIG. 1 illustrates a block diagram of an example environment 100 in which techniques discussed herein may be implemented. In some examples, the example environment 100 includes a serving computing system 102, which may include a payment processing service 104 and/or a blockchain disambiguation module 106, as discussed in more detail herein. The serving computing system 102 may be configured to communicate via network(s) 108 with one or more devices such as a device 110 associated with an identified entity 112, a device 114 associated with an unidentified entity 116, and/or a blockchain ledger system 118.

In some examples, the identified entity 112 may be a merchant and the device 110 may accordingly be a point-of-sale (POS) device operated by the merchant. The identified entity 112 may be "identified" in that the serving computing system 102 stores some information related to the device 110 and/or the identified entity 112. For example, the identified entity 112 may be a merchant registered with the payment processing service 104 to receive a service provided by the payment processing service 104 such as, for example, a capital loan product, a product for tracking inventory, a product for processing payments, a product for managing employees, a product for managing payroll, etc.

In some examples, the unidentified entity 116 may be "unidentified" in that the serving computing system 102 does not store any personal information, contact information, or the like for the unidentified entity. The serving computing system 102 may become aware of the existence of the unidentified entity 116 by means of the blockchain disambiguation module 106, which may identify a blockchain account (e.g., a cryptocurrency account) associated with the device 114 and/or the unidentified entity 116. In some examples, the blockchain disambiguation module may reconstruct transactions associated with a blockchain account (i.e., a "reconstructed wallet") associated with the unidentified entity 116 and may contact the unidentified entity 116 by conducting a blockchain transaction with the unidentified entity 116 (e.g., transfer a small amount of cryptocurrency to the blockchain account associated with the unidentified entity 116) that includes a message to the unidentified entity 116 that extends them a capital offer and/or provides a selectable option to provide information about the unidentified entity 116 to the serving computing system 102.

The serving computing system 102 may also communicate via the network(s) 108 with a blockchain ledger system 118 that stores a blockchain 120. The blockchain ledger system 118 may comprise one or more computers that store a copy of the blockchain 120 per a blockchain scheme. The blockchain 120 is an example blockchain that depicts the first two blocks (122(1) and (2)) up to the N-th block of the blockchain. The blocks are depicted as puzzle pieces to represent the encryption of a block being based on the encryption of the previous blocks.

In some examples, the blockchain 120 includes blocks that each record one or more transactions conducted via the blockchain. For example, block 122(1) is the first block in the blockchain 120 and includes a record of transactions 124(1) through 124(L). The number of transactions recorded by a block, L, may depend on a block size specified by the blockchain scheme, which may vary based on the cryptocurrency type (e.g., Bitcoin, Ethereum) and/or the cryptocurrency fork (e.g., Bitcoin Classic, Bitcoin XT, BIP 102, BIP 103, etc.). Therefore, the number of transactions recorded in a block may vary based on the size.

Taking transaction 124(L+1) as an example to illustrate how a block is formed on the blockchain for Bitcoin, a user desiring to make a Bitcoin payment may use software to create a new transaction by entering an amount of the transaction and the Bitcoin address of the recipient and transmitting this information to the blockchain ledger system 118 as a transaction that hasn't yet been recorded in a block of the blockchain (i.e., an "un-blocked transaction"). Since the blockchain ledger system 118 includes multiple computers, when the user sends the un-blocked transaction to the blockchain ledger system 118, one of the multiple computers receives the un-blocked transaction and shares it with others of the multiple computers until the payment request has been substantially distributed throughout the blockchain ledger system 118.

Some of the multiple computers making up the blockchain ledger system 118 are "miners" that create new blocks from un-blocked transactions. A miner computer receives un-blocked transactions and verifies the un-blocked transactions by determining that each un-blocked transaction accords with the cryptocurrency scheme (e.g., the un-blocked transaction includes valid signature(s), a sum of output(s) of the un-blocked transaction is no greater than the sum of input(s), etc.). Once the miner computer verifies enough un-blocked transactions to meet the block size, the miner has identified a potential block that could be added to the blockchain. In order for this block to be added to the blockchain, according to the blockchain scheme the miner must first generate a hash of the block concatenated to the blockchain that accords with a criterion specified by the blockchain scheme. In many blockchain schemes, this criterion includes a number of zeros that the hash must start with. Note that this is why the blocks are represented as puzzle pieces in the figures—the hash function is applied to all the former blocks of the blockchain with the potential block concatenated at the end of the chain as the N-th block. Therefore, the hash generated is an encryption of the entire blockchain plus the potential block.

For example, the miner applies a hash function (e.g., SHA-256) to the potential block concatenated to the former blocks to generate a hash until the hash starts with a minimum number of zeros (i.e., the hash is a small number, e.g., a hash that starts with 72 zeros)). These hashes are generated randomly, so the miner repeatedly reattempts to generate a hash that meets the hash criterion until the miner generates a hash that meets the hash criterion or until another miner generates a hash that meets the hash criterion, in which case the miner will start the process over.

When a miner finds a hash that accords with the hash criterion, the miner transmits an announcement to other miners of the blockchain ledger system 118 that the miner found a hash for the potential block. The other computers that receive the announcement check to make sure that the hash value accords with the hash criterion and that transactions of the potential block are valid (e.g., the un-blocked transaction includes valid signature(s), a sum of output(s) of the un-blocked transaction is no greater than the sum of input(s), etc.). So long as these conditions are met, the other computers add the potential block to the blockchain 120 as the next block of the blockchain 120 and continue adding blocks per this scheme. Therefore, the hash reflects the entire chain of blocks that have been accepted by the multiple computers of the blockchain ledger system 118. Finding a hash for a block that is accepted by the other computers is called "mining" a new block herein.

Each computer of the blockchain ledger system 118 stores a copy of the blockchain (i.e., sequential blocks of validated transactions for which a miner has generated a valid hash) and disseminates updates to the blockchain to the other computers of the blockchain ledger system 118 (e.g., when a miner mines a new block). In some examples, the serving computing system 102 may receive a copy of the blockchain to disambiguate at least a portion of the blockchain 120 according to the techniques discussed further herein.

Example Predictive Model

Figure 2:
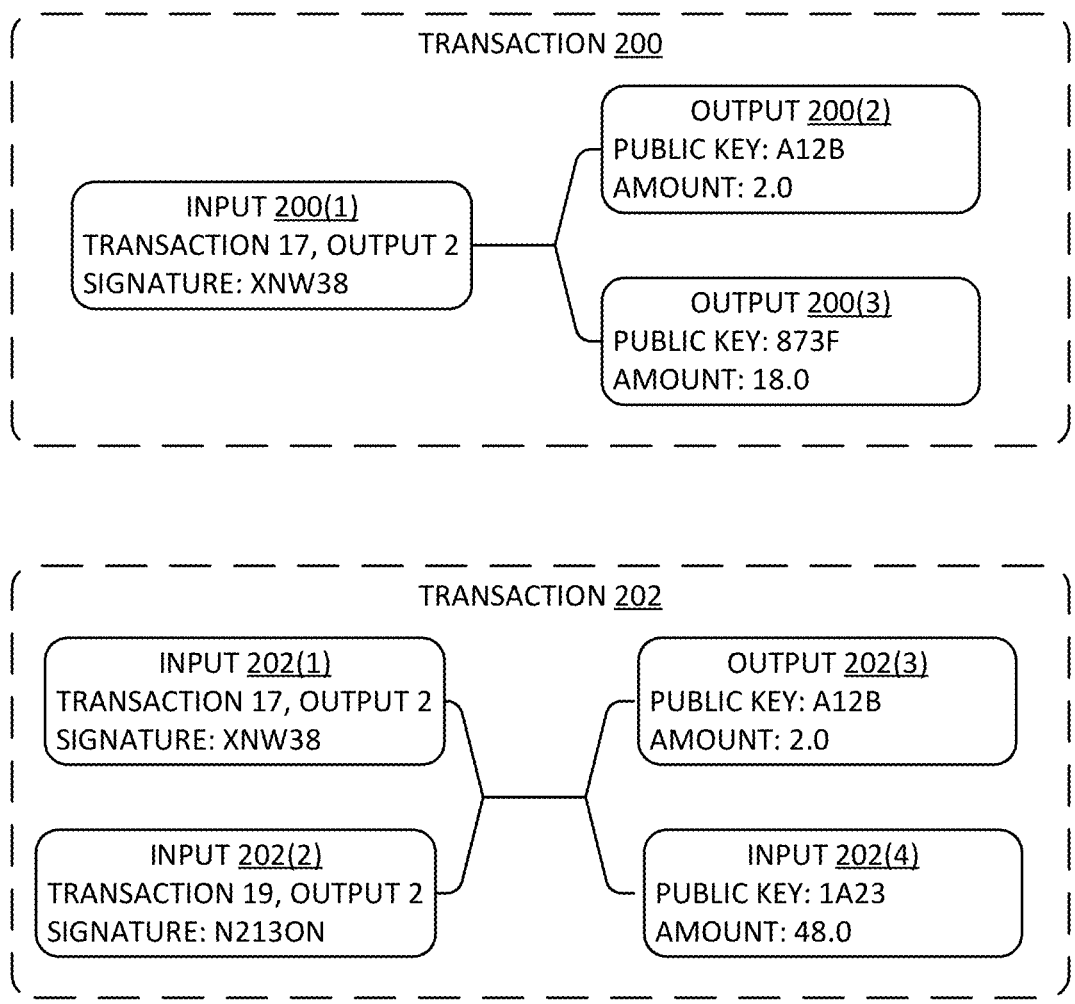
FIG. 2 illustrates a block diagram of example transactions recorded by a blockchain.

FIG. 2 illustrates a block diagram of two example blockchain transactions 200 and 202. These transactions may be examples of transactions that are recorded in the blockchain. In some examples, a cryptocurrency transaction may include an identification of at least one input and at least one output. An input may specify a source from which funds are transferred and an output may specify a destination to which the funds are transferred. In some examples, the source of funds includes an identification of an output of a previous transaction.

In some examples, since the transaction information is publicly available in the blockchain, the inputs and outputs specified by a transaction utilize asymmetric cryptography to prevent double-spending of funds transferred between accounts. The output(s) may include a public key that corresponds to a payee. In some examples, this public key acts as an address for the payee within the blockchain system. The output(s) may additionally or alternatively specify an amount of cryptocurrency to transfer to the payee.

The input(s) may include an encrypted signature that is generated by the payor from the payor's private key and a public key specified by the output of a prior transaction (i.e., thereby effectively spending the output of a previous transaction). According to the asymmetric cryptography scheme employed by the blockchain, the signature generated by the payor proves that the public key specified by the output of the prior transaction and the corresponding amount specified by the output are properly owned by the payor, which is verifiable by the blockchain ledger system using an asymmetric cryptography scheme.

For example, transaction 200 specifies an input 200(1), which points to a former transaction, identified as transaction 17 (i.e., the transaction identifier) in this example, and the second output of transaction 17, output 2 (i.e., the output identifier). The input 200(1) also specifies a signature ("XNW38," in the example, although real signatures would be much longer) that was generated by the payor using the public key of transaction 17, output 2 and the payor's private key. In some examples, in real practice, the input 200(1) may only specify the signature, since the public key, transaction identifier, and output identifier may be reversible using asymmetrical cryptography schemes. For this example, the transaction 17, output 2 previously conferred an amount of "20.0" in the cryptocurrency to the payor. Further, for the sake of simplicity, we will say that the public key for transaction 17, output 2 was also "A12B," although a same payor may be associated with multiple public keys.

In example transaction 200, the payor desires to pay the payee "18.0" in cryptocurrency. Therefore, example transaction 200 includes output 200(2) and output 200(3). Output 200(2) specifies a public key (A12B) associated with the payor and an amount (2.0). Output 200(3) specifies a public key (873F) associated with the payee and an amount (18.0). The output 200(2) specifies a remainder of the transaction 17, output 2 that was unspent and therefore returns to the payor.

Transaction 202 depicts an example transaction for a transaction where the amount desired to be transferred exceeds the amount of a previous transaction upon which the payor draws. The input 202(1) identifies a first transaction (transaction 17, output 2), valued at "20.0" in the cryptocurrency, and a second transaction (transaction 19, output 1), which previously conferred "30.0" in the cryptocurrency to the payor. If the payor desires to transfer "48.0" of the cryptocurrency to the payee, a device associated with the payor generates a signature for input 202(1) based on the payor's private key and the public key of transaction 17, output 2 ("XNW38") and a signature for input 202(2) based on the payor's private key and the public key of transaction 19, output 1. The payor in this example specifies a payment of "48.0" to be delivered to the payee associated with public key "1A23" and a remainder ("2.0") of the "50.0" drawn from transactions 17 and 19 returning to public key A12B, which is associated with the payor.

In some examples, the public key serves as a destination address for the funds transferred. In some examples, a payee address and/or a payor address (when the transaction includes a remainder) may serve as the destination address(es) for the funds transferred and may be specified in the output(s) of a transaction. The payee address may be generated from a public key associated with the payee (and would replace the public key discussed above, such as "873F" in transaction 200) and the payor address for the transaction may be generated from a public key associated with the payer (and would replace the public key discussed above, such as "A12B"). In some examples, an address and a private key pair may be generated for the output(s) of a transaction. That private key may be used to spend the amount associated with the address (by generating a signature that uses the address and the private key).

In sum, blockchain transactions include at least one input that specifies an encrypted identifier of an output of a former transaction's output and at least one output that specifies a blockchain address and an amount to be paid to the blockchain address, whether the blockchain address is an address generated from a public key or a public key itself. This manner of conducting transactions in the blockchain allows users to remain anonymous, obfuscating any identifying information to both humans and computers.

Example Process

Figure 3A:
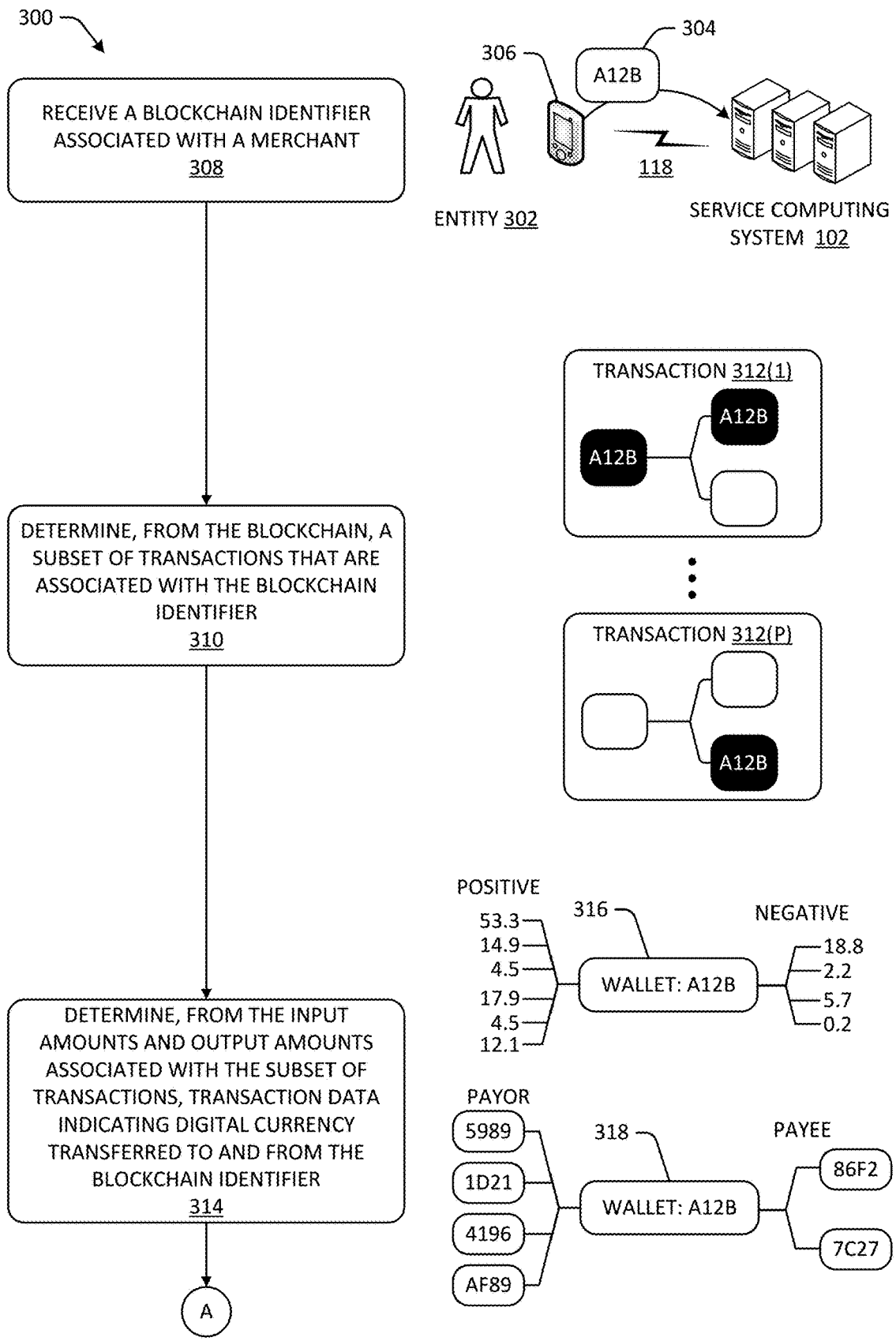
FIGS. 3A and 3B illustrate a pictorial flow diagram of an example process for disambiguating a blockchain to extend, modify, and/or approve a capital offer to an identified entity.

FIG. 3A illustrates a pictorial flow diagram and a block diagram of an example process 300 for disambiguating a blockchain to extend, modify, and/or approve a capital offer to an identified entity. Example process 300 may be used in an example where an entity 302 provides a blockchain identifier 304 to the serving computing system 102 via a device 306 associated with the entity 302 and via the network(s) 108. Providing the blockchain identifier 304 to the serving computing system makes entity 302 an "identified entity," according to the terms used in this specification. In some examples, the entity 302 may be a potential borrower and/or a merchant. In some examples, the device 306 may be a POS device.

At operation 308, the example process 300 may include receiving, at a serving computing system 102, a blockchain identifier 304 stored at device 306 and associated with the entity 302, according to any of the techniques discussed herein. The blockchain identifier 304 may include a blockchain address such as, for example, a public key and/or an address generated from a public key. In some examples, the blockchain identifier 304 may be received responsive to presentation of a user interface (UI) at the device 306 associated with the entity. For example, the UI may be part of a product provided by a payment processing service and/or a website associated with the payment processing service.

At operation 310, the serving computing system 102 may determine, from a blockchain, a subset of transactions (312(1)-(P)) that are associated with the blockchain identifier 304. In some examples, the serving computing system 102 may participate as a device in the blockchain ledger system 118 (e.g., as a miner and/or a node) and/or the serving computing system 102 may access the blockchain ledger system 118 to retrieve and store a copy of the blockchain or a portion thereof. In some examples, the serving computing system 102 may disambiguate the blockchain by searching the blockchain for inputs and/or outputs that reference the blockchain identifier 304. The search may include conducting asymmetric decoding of signatures specified in input(s) of transactions of the blockchain and/or blockchain addresses of output(s) of transactions of the blockchain using a public key of the blockchain identifier 304.

For example, the serving computing system 102 may search for input(s) that include a signature to which the blockchain identifier 304 corresponds (e.g., the blockchain identifier 304 may be used to decode the signature and receive the public key of the output upon which the input draws) and/or output(s) that include a public key or address matching the blockchain identifier 304.

FIG. 3A depicts an example subset of transactions 312(1) through 312(P) representing transactions that the serving computing system 102 determined as including input(s) and/or output(s) that correspond to the blockchain identifier 304. Transaction 312(1) depicts a simplified example where the serving computing system 102 has determined that a blockchain identifier 304, "A12B," corresponds to input 1 and output 1 of a transaction. This example illustrates a payment from the entity 302 to another entity, where the entity 302 received a remainder.

Transaction 312(P) depicts a simplified example where the serving computing system 102 has determined that a blockchain identifier 304, "A12B," corresponds to output 2 of a transaction. This example illustrates a payment made to the entity 302 from another entity.

At operation 314, the serving computing system 102 may determine, from input(s) and/or output(s) of the subset of transactions 312(1)-(P), blockchain transaction data indicating digital currency transferred to and/or from the blockchain identifier 304. The amalgamation of this activity is referred to herein as a "reconstructed wallet." For example, the blockchain transaction data may include one or more of amounts of positive transactions (i.e., transactions where the sum of the input(s) and output(s) of a transaction results in a sum increase of cryptocurrency accessible to the account associated with the blockchain identifier 304) and/or negative transactions (i.e., transactions where the sum of the input(s) and output(s) of a transaction results in a sum decrease of cryptocurrency accessible to the account associated with the blockchain identifier 304), dates of a transaction, identification of an address (e.g., payor address from which funds were received, payee address to which funds were sent), etc. For example, FIG. 3A includes a representation 316 of a reconstructed wallet where the values on the left ("Positive:" 53.3, 14.9, etc.) represent individual transactions associated with the blockchain identifier 304 that resulted in a sum positive flow of funds to the wallet (e.g., payments from a payor to the wallet) and the values on the right ("Negative:" 18.8, 2.2, etc.) represent individual transactions that resulted in a sum negative flow of funds from the wallet (i.e., payments from the wallet to a payee). For example, the number "53.3" indicated on the left side may represent a transaction where an input 1 identified an output of a prior transaction specifying an amount of 60.0, an output 1 specifying a remainder of 6.7 returning to another account, and an output 2 specifying an amount of 53.3 and the blockchain identifier 304. Similarly, representation 318 depicts blockchain identifiers of payors and payees from which and to which the wallet has made transactions.

In some examples, the serving computing system 102 may determine one or more characteristics of the blockchain transaction data associated with the blockchain identifier 304. In additional or alternate examples, the serving computing system 102 may take into account external transaction data (e.g., transaction data that is otherwise generated, for example, credit card transactions at a point of sale device). For example, the serving computing system 102 may determine whether the net flow of currency to and from the account is positive or negative (e.g., whether there is a positive net total transfer to the account); a moving average of net flow to and/or from the reconstructed wallet (e.g., average net flow within a time window); an age of the reconstructed wallet; an amount of transactions conducted with the reconstructed wallet per time period; an average value of transactions to and/or from the reconstructed wallet; identification of accounts with which the reconstructed wallet regularly interacts (e.g., threshold amount and/or value of transactions conducted with another account); an income factor that may include one of the characteristics discussed herein and/or a percentage or multiplier of an entity's income, etc. In some examples, the serving computing system 102 may determine whether blockchain identifiers with which the wallet has conducted transactions are associated with fraudulent activities, criminal activities, terrorist activities, and/or the like.

Figure 3B:
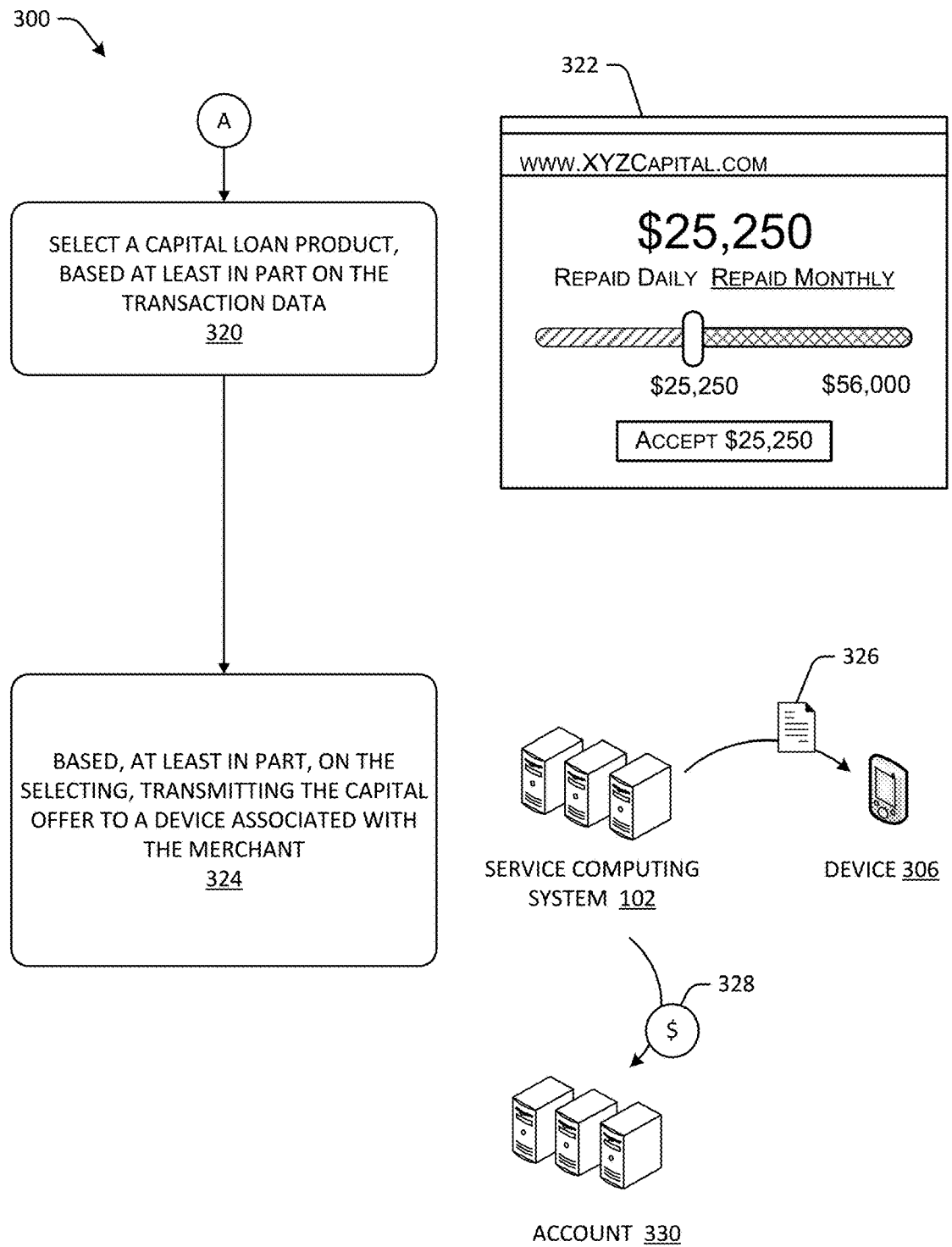

At operation 320, depicted in FIG. 3B, the process 300 may include selecting or modifying a capital loan product, based at least in part on the blockchain transaction data, as described above, and/or external transaction data that has been otherwise received.

For example, the serving computing system 102 may receive external transaction data from device 306 and/or other devices associated with the entity 302 and generate a capital loan product therefrom. In some examples, the external transaction data may be associated with a merchant profile of the entity 302 and the external transaction data may be generated by a point of sale application running on the device 306. In some examples, the serving computing system 102 may subsequently receive the blockchain identifier from which the serving computing system 102 may determine the blockchain-related transaction data discussed above. The serving computing system 102 may use the blockchain transaction data to modify and/or approve the capital loan product selected. For example, the blockchain-related transaction data may indicate additional income associated with the entity 302 and the serving computing system 102 may use this indication to modify the capital loan product selected by selecting a different capital loan product that offers a greater amount of capital, a lower interest rate, and so forth. This determination may be based, at least in part, on one or more characteristics of the reconstructed wallet determined by the serving computing system 102.

In additional or alternate examples, serving computing system 102 may determine, based at least on the blockchain-transaction data, to extend, modify, and/or approve a capital offer that references terms of the capital loan product. In some examples, this determination may be based, at least in part, on one or more characteristics of the reconstructed wallet determined by the serving computing system 102.

In some examples, a capital loan product, upon which a capital offer is based, may be associated with a predetermined criterion. For example, the predetermined criterion may specify a positive net flow of funds to and from a virtual reconstructed wallet, a minimum number of transactions per time period and/or a minimum average value per transaction (e.g., 5 transactions per day at a minimum average of $100 a transaction, 120 transactions per day at a minimum average of $4 per transaction), etc. These predetermined criterion may correspond with the characteristics determined by the serving computing system 102—in other words, the serving computing system 102 may determine the one or more characteristics in order to check whether the virtual reconstructed wallet satisfies the predetermined criterion. In examples that select a capital loan product, the predetermined criterion may further include similar criterion such as minimum number of external transactions per day, average of $4 a transaction per day for the external transactions and/or a total of the blockchain transactions and the external transactions, etc.

For example, the serving computing system 102 may approve a capital offer to the entity 302 based on a determination that a net flow of funds to and from the reconstructed wallet indicates a positive net flow of funds. In some examples, the serving computing system 102 may modify the capital offer extended to the entity 302. For example, the serving computing system 102 may adjust terms of a capital loan product (e.g., a total loan amount, interest, loan conditions, when payments are to be made) and/or the serving computing system 102 may change the capital loan product offered or add another capital offer so that the predetermined criterion are closely met. For example, if characteristics of a reconstructed wallet far exceed a predetermined criterion (e.g., predetermined criteria for a first capital loan product includes a wallet age of 1 year and an average of 30 transactions per day and the characteristics show that the wallet is 5 years old and is associated with an average of 300 transactions per day) the serving computing system 102 may adjust terms of a capital loan product, change the capital loan product offered, and/or offer an additional capital loan product having a predetermined criteria that is more closely met by the characteristics (e.g., a predetermined criteria of 4 years and an average of 200 transactions per day, for example).

In some examples, if the serving computing system 102 determines that characteristics of a reconstructed wallet do not satisfy the predetermined criterion for a first capital loan product, the serving computing system 102 may extend an offer for a second capital loan product associated with a predetermined criterion that is met by the characteristics. Or, in an example where the serving computing system 102 determines that the characteristics of a reconstructed wallet satisfy the predetermined criterion of the first capital loan product and additionally satisfy the predetermined criterion associated with a third capital loan product, the serving computing system 102 may additionally or alternatively extend an offer for the third capital loan product to the entity 302.

FIG. 3B depicts an example UI 322 that includes elements that serving computing system 102 may generate, based on the terms of the capital loan product that the serving computing system 102 selects. For example, the serving computing system 102 may determine a maximum loan amount available to be extended to an entity 302 based on the characteristics discussed above, which may be included in the UI at a far end of a slider (e.g., $56,000 in the example UI 322). In some examples, the serving computing system 102 may alter portions of the UI based at least in part on the modification of a capital loan offer and/or selection of an additional or alternate capital loan product based on characteristics of the reconstructed wallet, as discussed above. Of course, UI 322 is but one example of a UI that can be presented to an entity 302, and additional and/or alternative UIs can be imagined.

At operation 324, example process 300 may include transmitting a capital offer 326 to the device 306 associated with entity 302. In some examples, this may include transmitting computer-executable instructions to the device 306 to render a UI, such as example UI 322 discussed above. In some examples, where the entity 302 has already indicated that the entity 302 would like to receive funds according to terms of a capital loan product, operation 324 may include transmitting an approval of the capital offer 326 to the device 306 and the serving computing system 102 may, substantially simultaneously and based on an approval determined at operation 320, cause the agreed upon amount of capital loan funds 328 to be transferred to an account 330 associated with the entity 302. In some examples, the account 330 may be a blockchain account, such as a blockchain account associated with the blockchain identifier 304, and/or the account 330 may be a traditional bank account. In some examples, the capital offer 326 may include computer-executable instructions configured to allow a user to input an acceptance or modification of the terms via a device 306.

Unlike applying for a loan according to a traditional process, techniques discussed herein facilitate an atypical process because of the technical problems presented by a blockchain, as discussed in more detail above, and the technical solution described herein. For example, to obtain capital funds according to a traditional process an individual would need to gather documentation (detailed business records including sales data, capital contributions, owner loans, financing information, inventory data, periodic income, shareholder data, permitting information and other public records, etc.), fill out an application, and submit the application to an institution. That institution would perform a preliminary credit analysis and forward the application a centralized lending service, which would conduct a final credit analysis (e.g., which may further include other risk analysis and financial history checks), transmit a lending decision to the institution, prepare loan documents, and send the loan documents to the institution. The institution would then transmit the decision to the individual and schedule a closing where the individual could sign the documents. The institution would then verify those documents, fill out loan tickets, and perform regulatory filings before disbursing funds to the individual.

Techniques discussed herein eliminate multiple steps from the traditional process and provide a streamlined method for causing funds to be transferred to an account of the individual. In some examples, the individual may provide information about the individual for obtaining capital via a UI at device 306. This information may include a blockchain identifier that may be used by the system to determine characteristics of a reconstructed wallet associated with the blockchain identifier. Characteristics of the reconstructed wallet may be used by the system to determine whether to approve or modify a capital loan. In some examples, other information and/or underwriting research is not necessary. Upon determining characteristics of the wallet, the system may, upon approval received by the individual, cause funds to be transferred to an account of the individual.

Example Process

Figure 4A:
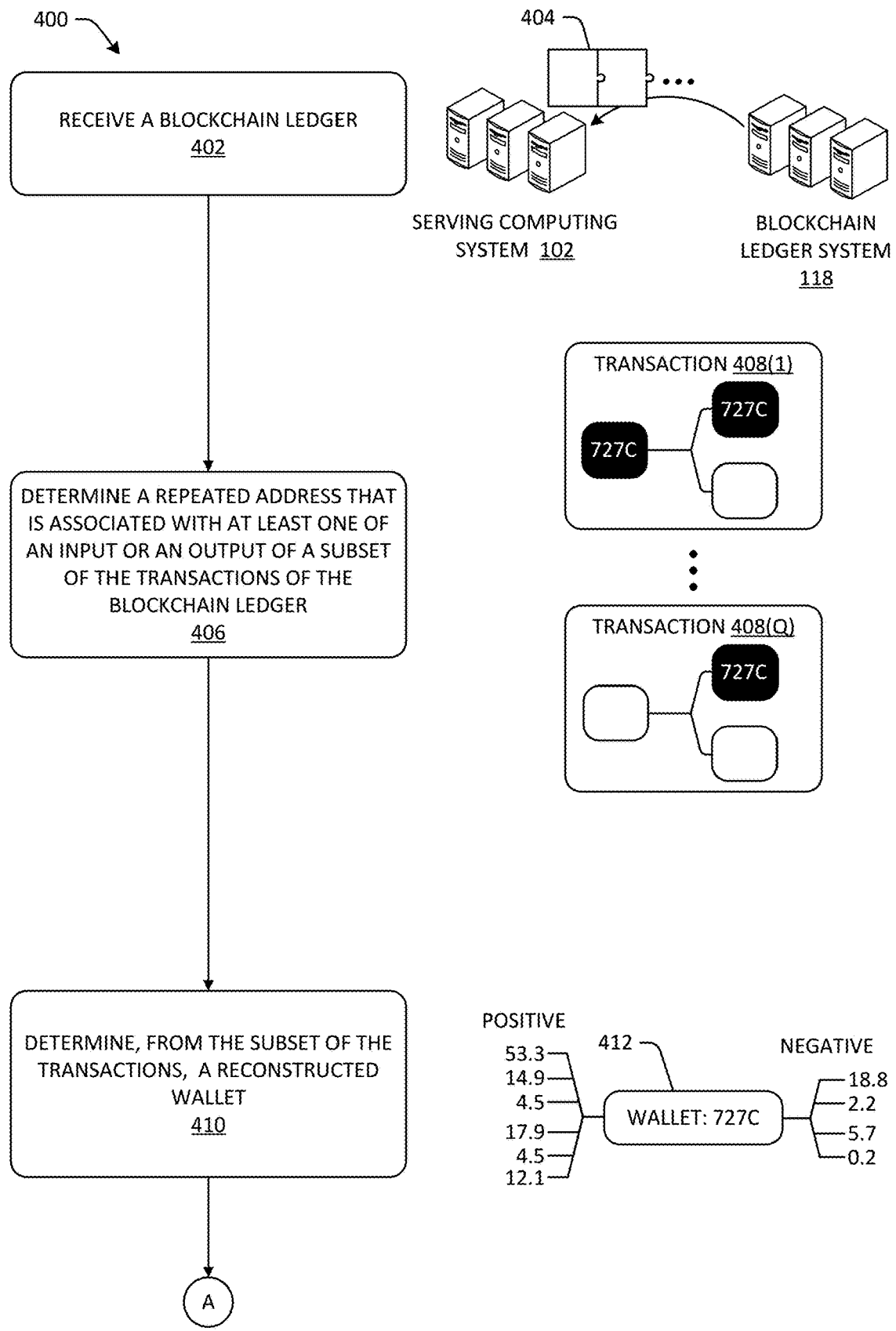
FIGS. 4A and 4B illustrate a pictorial flow diagram of an example process for disambiguating a blockchain to extend a capital offer to an unidentified entity.
Figure 4B:
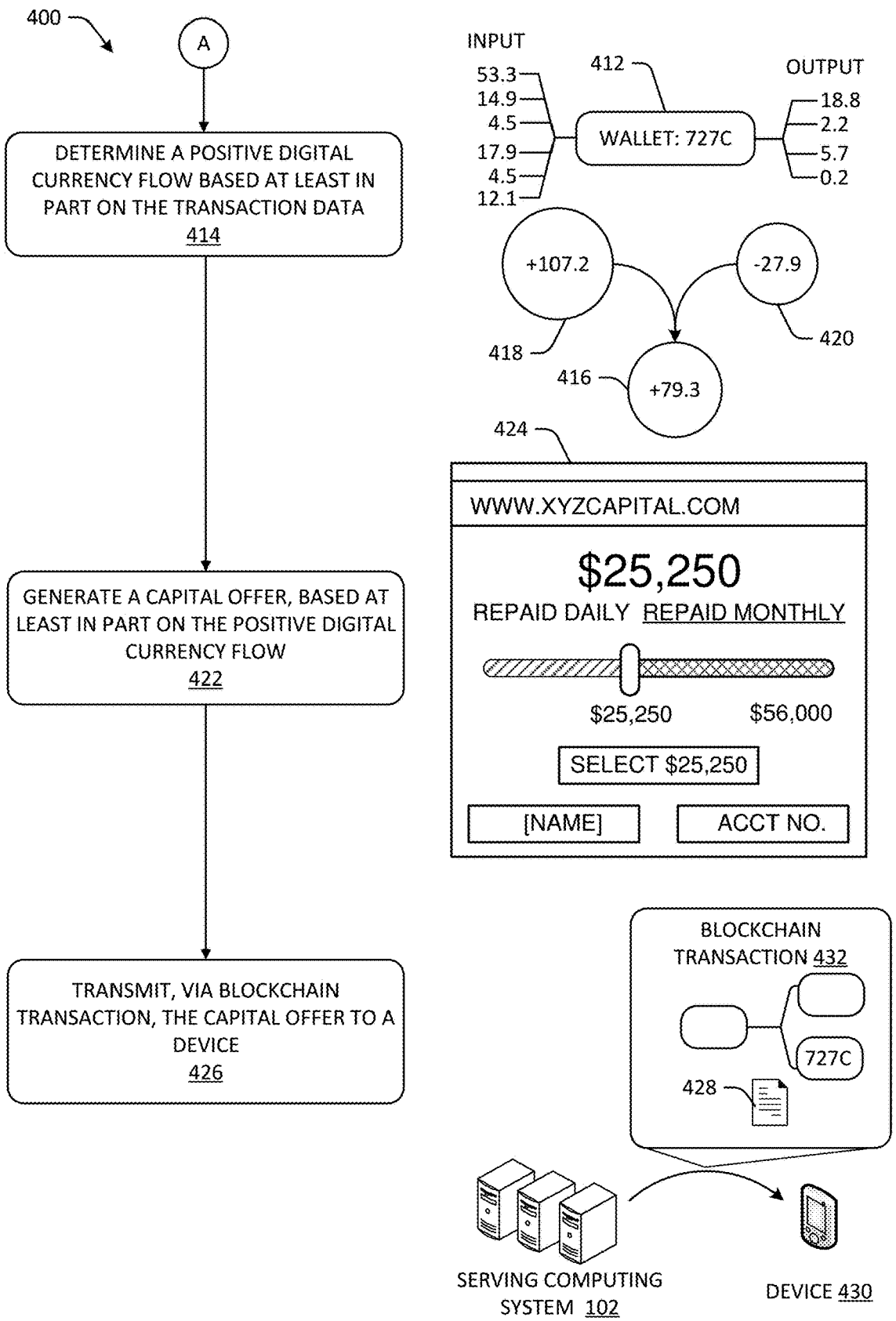

FIGS. 4A and 4B illustrate a pictorial flow diagram and a block diagram of an example process 400 for disambiguating a blockchain to extend a capital offer to an unidentified entity.

Referring to FIG. 4A, at operation 402, the example process 400 may include receiving a blockchain ledger 404 (e.g., a copy of the blockchain) at the serving computing system 102 from the blockchain ledger system 118, according to any of the techniques discussed herein. In some examples, the blockchain ledger may include references to individual transactions where an individual transaction may identify at least a payee address and a first amount of digital currency to be transferred to the payee address. An individual transaction may additionally or alternatively include a payor address and/or a reference to a former transaction's output, which may include an amount and/or a payee address for that transaction.

At operation 406, the example process 400 may include determining a repeated address ("727C" in this example) that is associated with at least one of an input or an output of a subset of the transactions of the blockchain. This may include determining a subset of transactions 408(1)-(Q) that are associated with the repeated address (e.g., the address appears as an input and/or output) and/or determining that the repeated address appears in the blockchain a predetermined number of times or satisfies one or more predetermined criteria (e.g., wallet age, number of transactions, positive flow of funds, estimated income). For example, the repeated address may be present in the blockchain ledger as a payor address, an encrypted component of a payor signature, and/or a payee address in a subset of transactions. In some examples, the serving computing system 102 may reconstruct all of the wallets reflected in the blockchain ledger 404. In some examples, the serving computing system 102 may identify the repeated address by determining that the address appears in the blockchain associated with an input and/or output a predetermined number of times (e.g., 1,000 transactions, 1,000,000 transactions) and/or that the transactions associated with the predetermined address are associated with amounts meeting a predetermined criterion (e.g., average amount per transaction over $5 at a transaction frequency of 1,000 transactions a month, average amount of transaction equal to or greater than $40).

At operation 410, example process 400 may include determining, from the subset of transactions 408(1)-(Q), blockchain transaction data indicating digital currency transferred to and/or from the repeated address (i.e., a "reconstructed wallet"). This may include determining, for each transaction of the subset, a net positive transfer to or net negative transfer from the wallet associated with the repeated address (e.g., over a predetermined time window), as depicted in example representation 412. Of course, determining the blockchain transaction data may include determining any of the attributes discussed herein, including one or more characteristics, as discussed in more detail above. Referencing transaction 200 of FIG. 2, for example, the net flow of currency for an entity associated with "A12B" would be a net negative flow of "−18.0" since the entity associated with "A12B" signed the public key associated with transaction 17, output 2 with the entity's private key, forming the signature "XNW38" and writing "20.0" to the block, "18.0" of which was output to "873F" and "2.0" of which was received by "A12B" as a remainder from the transaction, "2.0." Remember that the signature "XNW38," being an asymmetrically encrypted signature may be reversible to determine the public key associated therewith, which is A12B in this example.

At operation 414, depicted in FIG. 4B, example process 400 may include determining that the subset of transactions result in a net positive digital currency flow to the wallet, based at least in part on the blockchain transaction data (and/or external transaction data). Alternatively or additionally, the serving computing system 102 may determine any other characteristic discussed herein to determine whether a value of the characteristic satisfies a predetermined criterion for a capital loan product. For example, if a capital loan product is associated with a predetermined criterion that specifies that the wallet must be at least one year old, associated with an average of 5 transactions a day, and averages a positive net flow of funds per month, the serving computing system 102 may determine the age, average transaction number per day, and net flow of funds for the wallet per month.

FIG. 4B depicts a representation 416 of the net flow to and from a wallet in a month, for example. The sum input flow 418 is 107.2, the sum output flow 420 is −27.9, and the net flow 416 for the wallet is +79.3, a positive net flow of funds to the account. In some examples, the net flow 416, sum input flow 418, and/or sum output flow 420 may be calculated for a time window (e.g., per year, per month, per week, average per month, average per week, moving average over a month time window).

At operation 422, process 400 may include generating a capital offer by the serving computing system 102, based at least in part on the net positive flow to the wallet or, in additional or alternate examples, based on any other characteristic discussed herein. In some examples, the serving computing system 102 may select a capital loan product associated with a predetermined criterion that is met by one or more characteristics. The serving computing system 102 may apply a best-fit ranking algorithm to choose a top-R number (e.g., 2, 3) of capital loan products to include in the capital offer. In some examples, the capital offer generated by the serving computing system 102 may include computer-executable instructions for generating a UI, such as example UI 424, at a device.

At operation 426, process 400 may include transmitting the capital offer 428 to a device 430 via a blockchain transaction 432, using the repeated address. For example, the serving computing system 102 may transfer a small amount of cryptocurrency (e.g., one satoshi) to the repeated address and include the capital offer 428 as textual details and/or a hyperlink about a capital loan product that may be available to an unknown entity associated with the device 430 based on the unknown entity's reconstructed wallet and/or a link to a website to allow the unknown entity to provide further information to identify the unknown entity and/or to accept the terms of a capital loan product associated with the capital offer 428. Of course, it is understood that other methods of relaying the capital offer 428 with the blockchain transaction 432 are contemplated. In this manner, other information need not be obtained by the serving computing system 102 to contact the unknown entity.

In additional or alternative examples, at operation 426, process 400 may include determining that the repeated address is associated with a merchant profile that is associated with the device 430. In this example, the serving computing system 102 may use contact information associated with the merchant profile (e.g., email address, POS device identifier) to transmit the capital offer 428 to the device 430. For example, the serving computing system 102 may transmit the capital offer 428 to the device 430 to be displayed by a merchant application stored and executed by the device 430.

In some examples, the capital offer 428 may include a preliminary offer. Preliminary offers may be extended to entities about which the system may have little or no information, such as an entity associated with a repeated address that does not appear in a merchant profile stored by the system. In some examples, the preliminary offer may correspond to a first capital loan product presented via a UI before the blockchain disambiguation and the capital offer may be a capital offer presented via the UI after the blockchain disambiguation has been conducted (and characteristics of the reconstructed wallet have been determined). The capital offer may correspond to the first capital loan product, a modification of the first capital loan product, and/or a second capital loan product, depending on the determinations discussed herein regarding characteristics of the reconstructed wallet.

Example System

Figure 5:
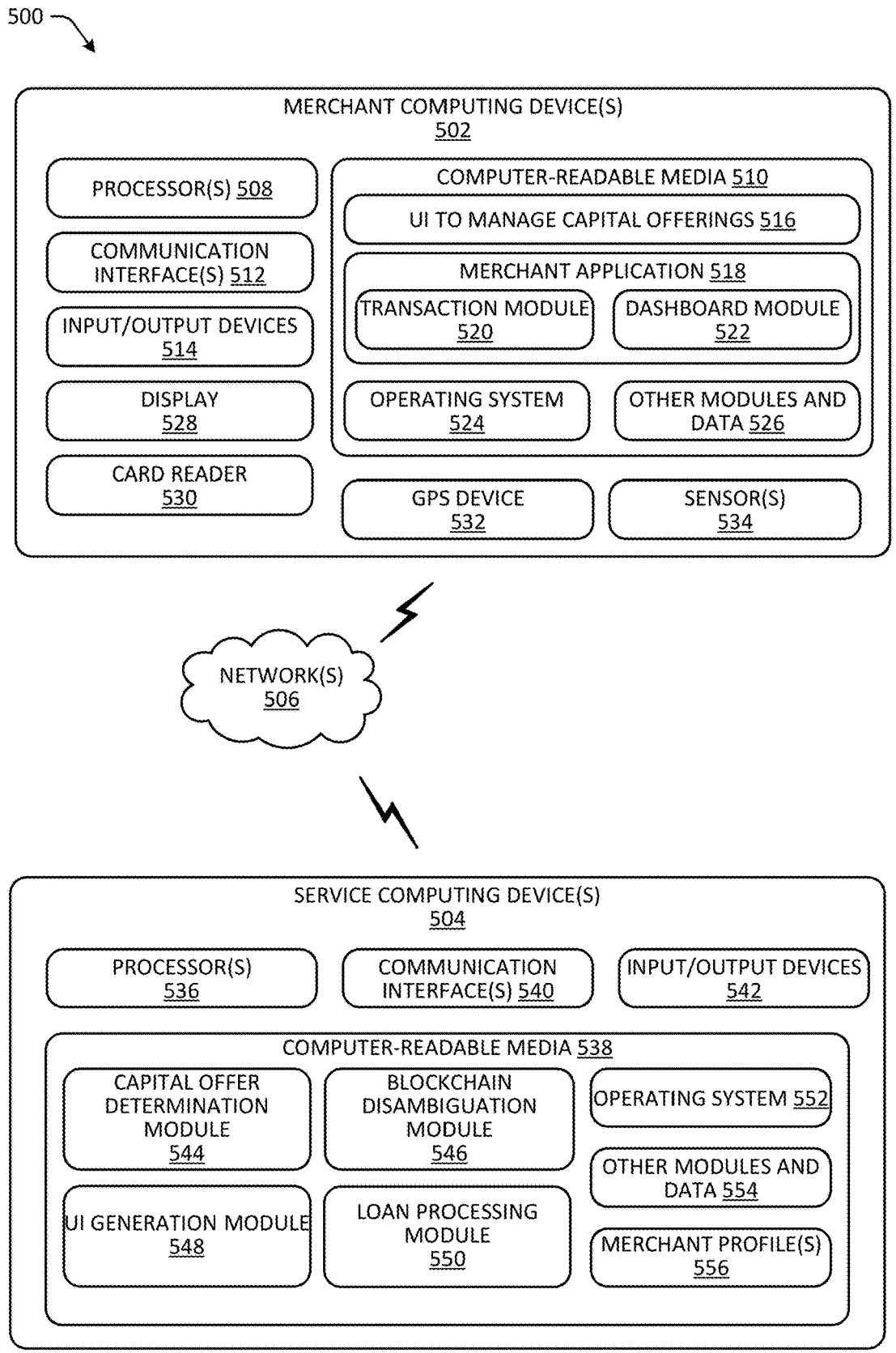
FIG. 5 illustrates an example merchant device and an example system for disambiguating a blockchain to extend, modify, and/or approve a capital offer.

FIG. 5 illustrates an example system 500 for extending, modifying, and/or approving a capital offer according to some implementations. For the purpose of FIG. 5, a potential borrower may be a merchant. However, in alternative examples, a potential borrower may be an entity other than a merchant and/or an unidentified entity. The system 500 may include merchant computing device(s) 502 (operated by merchant(s)) that communicate with serving computing device(s) 504 (which may be associated with a service provider such as a payment processing service) via network(s) 506 (e.g., the Internet, cable network(s), cellular network(s), wireless network(s) (e.g., Wi-Fi) and wired network(s), as well as close-range communications such as Bluetooth®, Bluetooth® low energy, and the like). Merchant computing device(s) 502 may correspond to device 110 and/or 114, serving computing device(s) 504 may correspond to serving computing system 102, and network(s) 506 may correspond to network(s) 108.

In at least one example, the merchant computing device(s) 502 may be any suitable type of computing device, e.g., portable, semi-portable, semi-stationary, or stationary. Some examples of the merchant computing device(s) 502 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant computing device(s) 502 include one or more processors 508, one or more computer-readable media 510, one or more communication interfaces 512, and one or more input/output (I/O) devices 514. Each processor 508 may itself comprise one or more processors or processing cores. For example, the processor(s) 508 may be implemented as one or more microprocessors, microcomputers, microcontrollers, digital signal processors, central processing units, state machines, logic circuitries, and/or any devices that manipulate signals based on operational instructions. In some examples, the processor(s) 508 may be one or more hardware processors and/or logic circuits of any suitable type specifically programmed or configured to execute the algorithms and processes described herein. The processor(s) 508 may be configured to fetch and execute computer-readable processor-executable instructions stored in the computer-readable media 510 to conduct any of the operations discussed herein.

Depending on the configuration of the merchant computing device(s) 502, the computer-readable media 510 may be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 510 may include, but is not limited to, RAM, ROM, EEPROM, flash memory, solid-state storage, magnetic disk storage, optical storage, and/or other computer-readable media technology. Further, in some examples, the merchant computing device(s) 502 may access external storage, such as RAID storage systems, storage arrays, network attached storage, storage area networks, cloud storage, or any other medium that can be used to store information and that can be accessed by the processor(s) 508 directly or through another computing device or network. Accordingly, the computer-readable media 510 may be computer storage media able to store instructions, modules or components that can be executed by the processor(s) 508. Further, when mentioned, non-transitory computer-readable media exclude media such as energy, carrier signals, electromagnetic waves, and signals per se.

The computer-readable media 510 may be used to store and maintain any number of functional components that are executable by the processor(s) 508. In some implementations, these functional components comprise instructions or programs that are executable by the processor(s) 508 and that, when executed, implement operational logic for performing the actions and services attributed above to the merchant computing device(s) 502. Functional components stored in the computer-readable media 510 may include a user interface (UI) to manage capital offers 516 and a merchant application 518, which may include a transaction module 520 and a dashboard module 522. In some examples, the transaction module 520 may be configured to conduct a blockchain transaction.

The UI to manage capital offers 516 may, among other things, present user interface(s) that enable a merchant to access capital offers and manage a capital offer process. In at least one example, the UI to manage capital offers 516 may be presented via a web browser, or the like. In other examples, the UI to manage capital offers may be presented via an application, such as a mobile application or desktop application, which is provided by the service provider, or which can be an otherwise dedicated application.

In at least one example, the UI to manage capital offers 516 may receive instructions from the serving computing device(s) 504. The instructions can instruct the UI to manage capital offers 516 to present a user interface that enables a merchant to view information associated with different loan products, as described above with reference to FIGS. 3A-4B. The user interface may surface information associated with a particular custom capital offer that corresponds to a capital loan product and/or terms selected by the serving computing device(s) 504 based, at least in part, on characteristics of a reconstructed wallet associated with the merchant computing device(s) 502 and/or predetermined criterion associated with the capital loan product. In some examples, elements of the UI may be modified in accordance with capital loan products for which the merchant qualifies via characteristics of the reconstructed wallet. For example, a maximum available loan amount displayed at an upper threshold of a slider may be a value that corresponds to a maximum loan amount of a capital loan product.

The UI to manage capital offers 516 may update information presented via the user interface as information regarding one or more reconstructed wallets is received by the serving computing device(s) 504. For example, the UI may display a preliminary capital offer 516 based on legal tender transactions of the merchant (and/or external transaction data generated at the merchant computing device(s), for example) and, upon receiving a blockchain identifier from the merchant and reconstructing the wallet associated with the blockchain identifier, the UI may be updated with a modified and/or different capital offer. The UI may therefore include an option to input a blockchain identifier.

In some examples, the user interface may include a mechanism, the actuation of which indicates that the merchant accepts a particular custom capital offer. The mechanism may be a graphical control element, control, widget, etc. In at least one example, the UI to manage capital offers 516 may determine when such a mechanism is actuated (e.g., by the merchant) and can send an instruction to the serving computing device(s) 504 to initiate loan processing. In some examples, this may include receiving actuation from an unknown entity. In such an example, actuation of such a mechanism may initiate display of a further UI to obtain further details about the unknown entity in order to initiate loan processing.

The merchant application 518 may provide POS functionality to the merchant computing device(s) 502 to enable the merchant to accept payments from one or more customers at a POS location. For example, the merchant may use the merchant computing device(s) 502 to accept payments through various different types of payment instruments, e.g., payment cards, electronic payment, cash or check, at the POS location from the one or more customers. In at least one example, the transaction module 520 may present various user interfaces to enable a merchant to conduct transactions, receive payments, and so forth. Further, the dashboard module 522 may enable the merchant to manage transactions, payments, and so forth, via a dashboard. For the purpose of this discussion, a dashboard can be a user interface that provides an at-a-glance view of key information (e.g., associated with transactions, payments, etc.).

Furthermore, the computer-readable media 510 may include additional functional components, such as an operating system 524 for controlling and managing various functions of the merchant computing device(s) 502 and for enabling basic user interactions. In addition, the computer-readable media 510 may also store data, data structures and the like, that are used by the functional components. Depending on the type of the merchant computing device(s) 502, the computer-readable media 510 may also optionally include other functional components and data, such as other modules and data 526, which may include programs, drivers, etc., and the data used or generated by the functional components. For instance, in some examples, the merchant computing device(s) 502 may include a payroll module, an inventory management module, an employee management module, a financing module, an appointment module, etc., which may facilitate payroll services, inventory management services, employee management services, financing services, appointment services, etc., respectively. Further, the merchant computing device(s) 502 may include many other logical, programmatic and physical components, of which those described are merely examples that are related to the discussion herein.

The communication interface(s) 512 may include one or more interfaces and hardware components for enabling communication with various other devices, such as over the network(s) 506 or directly. For example, communication interface(s) 512 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The merchant computing device(s) 502 may further include the one or more I/O devices 514. The I/O devices 514 may include speakers, a microphone, a camera, and various user controls (e.g., buttons, a joystick, a keyboard, a keypad, etc.), a haptic output device, and so forth.

In at least one example, merchant computing device(s) 502 may include a display 528. Depending on the type of computing device(s) used as the merchant computing device(s) 502, the display 528 may employ any suitable display technology. For example, the display 528 may be a liquid crystal display, a plasma display, a light emitting diode display, an OLED (organic light-emitting diode) display, an electronic paper display, or any other suitable type of display able to present digital content thereon. In some examples, the display 528 may have a touch sensor associated with the display 528 to provide a touchscreen display configured to receive touch inputs for enabling interaction with a graphic interface presented on the display 528. Accordingly, implementations herein are not limited to any particular display technology. Alternatively, in some examples, the merchant computing device(s) 502 may not include the display 528, and information can be presented by other means, such as aurally.

In addition, in some examples, the merchant computing device(s) 502 may include or may be connectable to a card reader 530. In some examples, the card reader 530 may plug in to a port in the merchant computing device(s) 502, such as a microphone/headphone port, a data port, or other suitable port. The card reader 530 may include a read head for reading a magnetic strip of a payment card, and further may include encryption technology for encrypting the information read from the magnetic strip. Alternatively, numerous other types of card readers may be employed with the merchant computing device(s) 502 herein, depending on the type and configuration of the merchant computing device(s) 502.

Other components included in the merchant computing device(s) 502 may include a global-positioning system (GPS) device 532 able to indicate location information. Further, the merchant computing device(s) 502 may include one or more sensors 534, such as an accelerometer, gyroscope, compass, proximity sensor, camera, microphone, and/or a switch, as discussed above. Additionally, the merchant computing device(s) 502 may include various other components that are not shown, examples of which include removable storage, a power source, such as a battery and power control unit, a barcode scanner, a printer, a cash drawer, and so forth.

As described above, techniques described herein are directed to disambiguating blockchain transactions to extend, modify, and/or approve a capital offers to an entity on behalf of a service provider. In some examples, the service provider may be a payment processing service, which may leverage merchant data associated with merchants to generate and present such custom capital offers to merchant(s). In some examples, the service provider may operate the serving computing device(s) 504. The serving computing device(s) 504 may include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the serving computing device(s) 504 as being present in a single location, these components and data may alternatively be distributed across different computing devices and different locations in any manner. Consequently, the functions may be implemented by one or more serving computing systems, with the various functionality described above distributed in various ways across the different computing devices. Multiple serving computing device(s) 504 may be located together or separately, and organized, for example, as virtual servers, server banks and/or server farms. The described functionality may be provided by the servers of a single entity or enterprise, or may be provided by the servers and/or services of multiple different customers or enterprises.

In the illustrated example, the serving computing device(s) 504 may include one or more processors 536, one or more computer-readable media 538, one or more communication interfaces 540, and one or more input/output devices 542. Each processor 536 may be a single processing unit or a number of processing units, and can include single or multiple computing units or multiple processing cores. The processor(s) 536 may be implemented as one or more microprocessors, microcomputers, microcontrollers, digital signal processors, central processing units, state machines, logic circuitries, and/or any devices that manipulate signals based on operational instructions. For example, the processor(s) 536 may be one or more hardware processors and/or logic circuits of any suitable type specifically programmed or configured to execute the algorithms and processes described herein. The processor(s) 536 may be configured to fetch and execute computer-readable instructions stored in the computer-readable media 538, which may program the processor(s) 536 to perform the functions described herein.

The computer-readable media 538 may include volatile and nonvolatile memory and/or removable and non-removable media implemented in any type of technology for storage of information, such as computer-readable instructions, data structures, program modules, or other data. Such computer-readable media 538 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the serving computing device(s) 504, the computer-readable media 538 may be a type of computer-readable storage media and/or can be a tangible non-transitory media to the extent that when mentioned, non-transitory computer-readable media exclude media such as energy, carrier signals, electromagnetic waves, and signals per se.

The computer-readable media 538 may be used to store any number of functional components that are executable by the processors 536. In many implementations, these functional components comprise instructions or programs that are executable by the processors 536 and that, when executed, specifically configure the one or more processors 536 to perform the actions attributed above to the service provider and/or payment processing service. Functional components stored in the computer-readable media 538 may include a capital offer determination module 544, a blockchain disambiguation module 546, a UI generation module, and a loan processing module 550.

The capital offer determination module 544 may determine a plurality of custom capital offers for a particular merchant. In at least one example, the capital offer determination module 544 may access merchant data stored in merchant profile(s), described below, and may read the merchant data to determine a range of funds that the merchant is qualified to receive (e.g., a minimum and a maximum amount of funds that the payment processing service is willing to make available to the merchant). In some examples, the capital offer determination module 544 may receive blockchain information from the merchant to include reconstructed wallet information determined by the blockchain disambiguation module 546 in the merchant data. The capital offer determination module 544 may utilize one or more risk analysis techniques to determine the range of funds that the merchant is qualified to receive. In some examples, the loan terms (e.g., the capital loan product selected by the capital offer determination module 544) may be determined based at least in part on characteristics of a reconstructed wallet and/or other funds available to the merchant and predetermined criterion associated with capital loan products.

The blockchain disambiguation module 546 may receive a blockchain identifier and/or identify a repeated blockchain address, as discussed in more detail above, and may reconstruct a wallet using the blockchain identifier and/or the repeated blockchain address. The blockchain disambiguation module 546 may additionally or alternatively determine characteristics of transactions associated with the reconstructed wallet.

In some examples, the blockchain disambiguation module 546 may extend, modify, and/or approve a capital offer, which may include selecting one or more capital loan products. The blockchain disambiguation module 546 (and/or the capital offer determination module 544) may send the capital offer to the merchant computing device(s) 502 via the network(s) 506. In some examples, the blockchain disambiguation module 546 may conduct a blockchain transaction with a blockchain account by transmitting a small amount of cryptocurrency (e.g., one Satoshi) to a blockchain address with a message referencing the capital offer appended to the transaction (e.g., as text, as a link to a website).

In some examples, extending the capital offer refers to transmitting the offer and/or selecting a capital loan product to reference in the offer. In some examples, approving a capital offer may refer to preliminarily approving an entity to receive a capital offer and initiating loan processing, which may include transferring funds to an account of an entity. A capital loan may be approved when an entity has encountered the capital offer in some manner (e.g., by visiting a website and encountering the capital offer, by receiving the capital offer at a device associated with the entity). In some examples, modifying the capital offer may refer to, based, at least in part, on characteristics of a reconstructed wallet, selecting an additional or alternate capital loan product and/or altering terms of a capital loan product.

The UI generation module 548 may determine instructions for generating a user interface. In some examples, the UI generation module 548 may generate and/or send the instructions to the merchant computing device(s) 502 responsive to receiving an indication of interest from the merchant computing device(s) 502. In some examples, the UI generation module 548 may send information associated with a capital loan product (and perhaps pre-approval) to the merchant computing device(s) 502. For instance, the UI generation module 548 may send an electronic communication (e.g., an email, a text message, a push notification, a blockchain transaction, etc.) to an address associated with a merchant profile of a merchant. In some examples, the address may correspond to the merchant computing device(s) 502 such that the merchant computing device(s) 502 may present the communication to the merchant. In such examples, the communication may include a mechanism, the actuation of which causes an indication of interest to be sent to the serving computing device(s) 504, may cause a GUI to be displayed for modifying and/or accepting terms of the capital loan, and the like.

The UI generation module 548 may receive the indication of interest. In some examples, the indication of interest may be associated with an identity of the merchant. The UI generation module 548 may retrieve the plurality of custom capital offers associated with the merchant and may determine instructions for generating the user interface and/or the UI generation module 548 may receive reconstructed wallet information and/or a capital loan product selection from the blockchain disambiguation module 546. The UI generation module 548 may send the instructions to the merchant computing device(s) 502. That is, in some examples, the UI generation module 548 may send the instructions to the merchant computing device(s) 502 responsive to receiving the indication of interest.

In additional and/or alternative examples, the UI generation module 548 may cause a notification to be presented via a dashboard presented via the merchant computing device(s) 502. For instance, the UI generation module 548 may send instructions to the dashboard module 522 to cause the dashboard module 522 to provide a notification that the merchant is qualified for a capital loan in association with the merchant's dashboard. In such examples, the notification may include a mechanism, the actuation of which causes an indication of interest to be sent to the serving computing device(s) 504. The UI generation module 548 may receive the indication of interest. In such examples, the indication of interest may be associated with an identity of the merchant.

The UI generation module 548 may receive reconstructed wallet information and/or a capital loan product selection from the blockchain disambiguation module 546. The UI generation module 548 may send instructions to the merchant computing device(s) 502 to generate a UI for presenting details of the capital loan product and/or portions selectable for providing further information or at least one of an acceptance of the terms, which triggers a transfer of funds to an account of the individual. That is, in at least one example, the UI generation module 548 can send the instructions to the merchant computing device(s) 502 responsive to receiving the indication of interest.

Furthermore, in at least one example, the UI generation module 548 may cause a webpage to be presented via a website associated with the payment processing service. The webpage may provide information about capital loan products. In at least one example, the website may include a mechanism, the actuation of which causes an indication of interest to be sent to the serving computing device(s) 504. The UI generation module 548 may receive the indication of interest. In at least one example, the indication of interest may be associated with an identity of the merchant. The UI generation module 548 may retrieve the plurality of custom capital offers associated with the merchant and/or the UI generation module 548 may receive reconstructed wallet information and/or a capital loan product selection from the blockchain disambiguation module 546 and can determine instructions for generating the user interface. The UI generation module 548 may send the instructions to the merchant computing device(s) 502. That is, in at least one example, the UI generation module 548 may send the instructions to the merchant computing device(s) 502 responsive to receiving the indication of interest.

In some examples, the webpage may be accessed by a merchant without the merchant providing an indication of the identity of the merchant. In such examples, the UI generation module 548 may receive the indication of interest, determine that the merchant associated with the indication of interest is unidentified, and send a notification to the capital offer determination module 544 and/or the blockchain disambiguation module 546. Responsive to receiving such a notification, the capital offer determination module 544 may send a request, via the website for example, for information associated with the merchant. The information may include a merchant identifier, if the merchant has an existing merchant profile associated with the payment processing service; the information may include merchant information sufficient to establish a merchant profile for the merchant; and/or the information may include blockchain identifier. Based on receiving such information, the capital offer determination module 544 and/or the blockchain disambiguation module 546 may determine a plurality of custom capital offers and/or retrieve a plurality of previously generated custom capital offers associated with the merchant and the UI generation module 548 may determine instructions for generating a user interface based on the plurality of custom capital offers (recently or previously generated).

The loan processing module 550 may receive an instruction from the merchant computing device(s) 502 indicating that the merchant accepts an offer for a custom capital loan. The instruction may indicate which capital loan product the merchant accepts, which may be determined based on actuation of a mechanism at a UI and/or website presented at a device associated with the merchant. Based at least in part on receiving the instruction, the loan processing module 550 may initiate processing the loan. That is, the loan processing module 550 may send one or more requests for information to process the loan. In at least one example, the loan processing module 550 may send a request for an affirmation that the merchant agrees to the terms of the loan (e.g., in addition to actuating the mechanism associated with the capital offer on the user interface). Responsive to receiving an affirmation that the merchant agrees to the terms of the loan, the loan processing module 550 may send an instruction to transfer an amount of funds corresponding to at least a portion of the loan to an account of the merchant. In at least one example, the amount of funds may be transferred from an account of the payment processing service to an account of the merchant via an electronic funds transfer, a blockchain transaction, and/or other near-real time transfer. In some examples, the loan processing module 550 may, at this point, request that the blockchain disambiguation module 546 reconstruct a wallet associated with the merchant in an attempt to approve the capital offer.

Additional functional components stored in the computer-readable media 538 may include an operating system 552 for controlling and managing various functions of the serving computing device(s) 504.

In at least one example, the computer-readable media 538 may include or maintain other functional components and data, such as other modules and data 554, which may include programs, drivers, etc., and the data used or generated by the functional components. Further, the serving computing device(s) 504 may include many other logical, programmatic and physical components, of which those described above are merely examples that are related to the discussion herein.

In addition, the computer-readable media 538 may store data used for performing the operations described herein. Thus, the computer-readable media 538 may store merchant profile(s) 556. In at least one example, the merchant profile(s) 556 may store information associated with individual merchant(s). For instance, a merchant profile of the merchant profile(s) 556 may store merchant data including, but not limited to, a blockchain identifier, a reconstructed wallet, blockchain transaction data, a merchant category classification (MCC), item(s) offered for sale by the merchant, external transaction data associated with transactions conducted by the merchant (e.g., via the merchant application 518), hardware (e.g., device type) used by the merchant, previous loans made to the merchant, previous defaults on said loans, an indication of risk (e.g., based at least in part on fraud, chargeback, etc.) associated with the merchant, etc. In at least one example, a merchant profile may store data derived from the transaction data. For instance, a merchant profile may store merchant data indicating a volume of transactions processed by the payment processing service on behalf of the merchant, a frequency of transactions processed by the payment processing service on behalf of the merchant, etc.

The communication interface(s) 540 may include one or more interfaces and hardware components for enabling communication with various other devices, such as over the network(s) 506. For example, communication interface(s) 540 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The serving computing device(s) 504 may further be equipped with various input/output (I/O) devices 542. Such I/O devices 542 may include a display, various user interface controls (e.g., buttons, joystick, keyboard, mouse, touch screen, etc.), audio speakers, connection ports and so forth.

FIGS. 3A-4B include flow diagrams illustrating example processes according to some implementations. The processes of FIGS. 3A-4B include illustrations of collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks may be combined in any order and/or in parallel to implement the process, or alternative processes, and not all of the blocks need be executed. Further, in some examples, some or all of the operations illustrated in one or more of FIGS. 3A-4B may be combined with some or all of the operations illustrated in others of FIGS. 3A-4B. For discussion purposes, the processes are described with reference to the environments, architectures and devices described in the examples herein, although the processes can be implemented in a wide variety of other environments, architectures and devices.

Various instructions, methods and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or can be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or any combination thereof, including multiples of each element. Unless explicitly described as singular, "a" means singular and plural.

While one or more examples of the techniques have been described, various alterations, additions, permutations and equivalents thereof are included within the scope of the techniques.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
memory storing instructions that, when executed by the one or more processors, cause the one or more processors to perform operations comprising:
accessing a blockchain ledger referencing transactions between two or more parties, an individual transaction identifying at least a payee address, and a first amount of digital currency to be transferred to the payee address;
determining a repeated address corresponding to an unidentified entity and that is associated with at least one of an input or an output of a subset of the transactions using the blockchain ledger;
constructing, from the subset of the transactions and for the repeated address, a virtual wallet that specifies a net positive transfer or net negative transfer for the subset of the transactions;
determining one or more characteristics of the virtual wallet that satisfy a predetermined financing criterion, wherein the one or more characteristics include an average positive net total transfer of blockchain-associated transactions to the virtual wallet and the predetermined financing criterion includes a threshold time period where the virtual wallet is associated with the average positive net total transfer of the blockchain-associated transactions;
generating a capital loan product based at least in part on the virtual wallet satisfying the predetermined financing criterion;
based at least on the predetermined financing criterion being satisfied, transmitting, to a blockchain ledger system corresponding to the blockchain ledger, a blockchain transaction directed to the repeated address of the unidentified entity for recordation on the blockchain ledger, the transmitted blockchain transaction transferring a second amount of digital currency to the repeated address, the transmitted blockchain transaction further transmitting first data for a capital offer to the repeated address, the first data for the capital offer including instructions that cause a device associated with the repeated address to display a user interface including information related to the capital loan product, the user interface including a moveable element that is movable, by user interaction with the user interface, to a plurality of locations representative of a plurality of respective monetary values, enabling a user of the device to move the moveable element to modify an amount of the capital offer within a monetary value boundary set based at least in part on the subset of the transactions associated with the virtual wallet.

2. The system of claim 1, wherein the one or more characteristics include at least one of an average number of transactions within the threshold time period or an average transaction value within the threshold time period.

3. The system of claim 1, wherein the individual transaction further identifies at least one of a payor address or transaction output.

4. The system of claim 1, wherein the capital offer further includes a command configured to cause the device to present, via the user interface, a mechanism to receive at least one of identifying information or an acceptance of the capital offer.

5. The system of claim 1, the operations further including:
receiving an acceptance of the capital offer; and
responsive to receiving the acceptance, causing at least part of loan funds specified by the capital loan product to be transferred to an account associated with the device.

6. The system of claim 5, wherein causing at least part of the loan funds to be transferred includes transmitting an additional blockchain transaction to send at least part of the loan funds to the repeated address.

7. A computer-implemented method comprising:
accessing a blockchain ledger referencing transactions between two or more parties;
identifying, from the blockchain ledger, a blockchain address for an individual transaction, the blockchain address associated with an unidentified entity;
determining, from the blockchain ledger, that the blockchain address is associated with one or more other transactions;
constructing, from the individual transaction and the one or more other transactions, a virtual wallet that specifies at least transfers to or from the virtual wallet corresponding to the individual transaction and the one or more other transactions;
determining one or more characteristics of the transfers to or from the virtual wallet that satisfy a predetermined criterion, wherein the one or more characteristics include an average positive net total transfer of blockchain-associated transactions to the virtual wallet and the predetermined criterion includes a threshold time period where the virtual wallet is associated with the average positive net total transfer of the blockchain-associated transactions;
generating a capital loan product, based, at least in part, on the one or more characteristics; and
based at least on the predetermined criterion being satisfied, transmitting, to a blockchain ledger system corresponding to the blockchain ledger, a first blockchain transaction for inclusion in the blockchain ledger and directed to the blockchain address associated with the unidentified entity, the transmitted first blockchain transaction transferring a first amount of digital currency and first data associated with a capital offer to the blockchain address, the first data for the capital offer including instructions that cause a device associated with the blockchain address to display a user interface including information related to the generated capital loan product, the user interface including a moveable element that is movable, by user interaction with the user interface, to a plurality of locations representative of a plurality of respective monetary values, enabling a user of the device associated with the blockchain address to move the moveable element to modify an amount of the capital offer within a monetary value boundary set based at least in part on the subset of the transactions associated with the virtual wallet.

8. The computer-implemented method of claim 7, wherein the first blockchain transaction further includes a mechanism for receiving at least one of: an acceptance of the capital offer, an indication of interest in the capital offer, or identification information associated with the unidentified entity associated with the blockchain address.

9. The computer-implemented method of claim 8, wherein the first blockchain transaction further includes instructions configured to cause the device to present, via the user interface, the mechanism.

10. The computer-implemented method of claim 7, wherein the blockchain address specifies at least a payee address and the individual transaction specifies an amount of digital currency transferred to the payee address.

11. The computer-implemented method of claim 7, wherein the individual transaction is associated with a net transfer of digital currency to or from the blockchain address.

12. The computer-implemented method of claim 7 further comprising:
   receiving an acceptance of the capital offer and identifying information associated with the unidentified entity associated with the blockchain address, wherein the unidentified entity becomes an identified entity; and
   causing at least part of loan funds specified by the capital loan product to be transferred to an account associated with the identified entity.

13. The computer-implemented method of claim 12, wherein causing at least part of the loan funds to be transferred includes transferring a second amount of digital currency to the blockchain address via a second blockchain transaction.

14. The computer-implemented method of claim 7, wherein the one or more characteristics include an average transaction value within the threshold time period.

15. A non-transitory computer-readable medium storing instructions that, when executed by one or more processors, configure the one or more processors to perform operations comprising:
   accessing a blockchain ledger stored in a memory;
   identifying, from the blockchain ledger, a blockchain address that is associated with one or more transactions, wherein the blockchain address is associated with an unidentified entity;
   determining one or more characteristics of the one or more transactions that meet one or more predetermined criteria, wherein the one or more characteristics include an average positive net total transfer of blockchain-associated transactions associated with the blockchain address and the one or more predetermined criteria include a threshold time period where the blockchain address is associated with the average positive net total transfer of blockchain-associated transactions;
   generating a capital offer associated with capital loan product based at least in part on the one or more characteristics meeting the one or more predetermined criteria; and
   based at least on the predetermined criterion being satisfied, transmitting, to a blockchain ledger system corresponding to the blockchain ledger, a blockchain transaction for inclusion in the blockchain ledger and directed to the blockchain address associated with the unidentified entity, the transmitted blockchain transaction transferring an amount of digital currency and first data associated with the capital offer to the blockchain address, the first data for the capital offer including instructions that cause a device associated with the blockchain address to display a user interface including information related to the capital loan product, the user interface including a moveable element that is moveable, by user interaction with the user interface, to a plurality of locations representative of a plurality of respective monetary values, enabling a user of the device to move the moveable element to modify an amount of the capital offer within a monetary value boundary set based at least in part on the one of more transactions.

16. The non-transitory computer-readable medium of claim 15, wherein the one or more characteristics include an average number of transactions within the threshold time period.

17. The non-transitory computer-readable medium of claim 15, the operations further comprising receiving an indication of a blockchain transaction that includes a mechanism for receiving at least one of: an acceptance of the capital offer, an indication of interest in the capital offer, or identification information associated with the unidentified entity associated with the blockchain address.

18. The non-transitory computer-readable medium of claim 15, the operations further comprising:
   receiving a message via the user interface indicating an acceptance of the capital offer, the message being associated with a mechanism associated with the user interface; and
   based, at least in part, on receiving the message, causing funds to be transferred to an account associated with at least one of the message or the device, the funds corresponding to at least part of funds of the capital loan product associated with the capital offer.

19. The non-transitory computer-readable medium of claim 18, wherein causing the funds to be transferred includes transmitting an additional blockchain transaction.

\* \* \* \* \*